United States Patent [19]

Georlette et al.

[11] Patent Number: 4,849,134
[45] Date of Patent: Jul. 18, 1989

[54] GRANULAR FLAME RETARDANT AGENTS AND PROCESS FOR THEIR PREPARATION

[75] Inventors: Pierre Georlette, Omer; Hanoch Goren, Kiryat-Bialik; Shaul Shmilowitz, Beer-Sheva; Avraham Teuerstein, Omer, all of Israel

[73] Assignee: Bromine Compounds Limited, Israel

[21] Appl. No.: 201,341

[22] Filed: May 31, 1988

Related U.S. Application Data

[63] Continuation of Ser. No. 925,745, Oct. 30, 1986, abandoned.

[30] Foreign Application Priority Data

Nov. 13, 1985 [IL] Israel ......................... 77034
Sep. 12, 1986 [IL] Israel ......................... 80021

[51] Int. Cl.$^4$ ...................... C09K 21/00; C09D 5/16; C09D 5/18
[52] U.S. Cl. ..................... 252/601; 252/604; 252/609; 252/5; 252/8; 106/18.24; 106/18.25; 106/18.35
[58] Field of Search ............ 252/2, 601, 5, 603, 252/607, 8, 608, 609, 610, 611; 525/439; 106/18.11, 18.24, 18.25, 18.35; 428/407; 521/907; 523/207, 220; 524/142

[56] References Cited

U.S. PATENT DOCUMENTS

| | | | |
|---|---|---|---|
| 3,897,389 | 7/1975 | Touval | 252/609 |
| 4,022,856 | 5/1977 | Maxey | 156/196 |
| 4,089,912 | 5/1978 | Levek | 252/609 |
| 4,102,853 | 7/1978 | Kawamura et al. | 524/425 |
| 4,182,799 | 1/1980 | Rodish | 252/601 |
| 4,243,579 | 1/1981 | Keogh | 252/609 |
| 4,341,881 | 7/1982 | Kracklauer et al. | 252/609 |
| 4,377,506 | 3/1983 | Sprague | 252/609 |
| 4,530,880 | 7/1985 | Taniuchi et al. | 252/609 |
| 4,546,126 | 10/1985 | Breitenfellner et al. | 524/94 |
| 4,616,042 | 10/1986 | Avakian | 525/439 |
| 4,668,720 | 5/1987 | Kauth et al. | 524/86 |

*Primary Examiner*—Howard J. Locker
*Attorney, Agent, or Firm*—Lerner, David, Littenberg, Krumholz & Mentlik

[57] ABSTRACT

Granular flame retardant agents are disclosed which incorporate halogenated organic flame-retardant compounds, without any binders. The granular agents may further contain desired additives and organic or inorganic flame-retardant synergistic materials. The granular agents are dust-free and are usefully employed in a method for imparting flame-retardant properties to flammable plastic materials. A process for the preparation of the granular flame retardant agents of the invention by cold compaction is also described.

11 Claims, No Drawings

GRANULAR FLAME RETARDANT AGENTS AND PROCESS FOR THEIR PREPARATION

This is a continuation of application Ser. No. 925,745, filed Oct. 30, 1986, now abandoned.

BACKGROUND OF THE INVENTION

1. The Field of the Invention

The present invention relates to granular flame retardant agents, to a process for preparing the same, to a method for imparting flame-retardant properties to plastic materials using said agents, and to flame-retarded plastic materials obtained thereby.

More particularly, the present invention refers to the use of halogenated hydrocarbon flame retardant agents, alone or in admixture with organic flame-retardant agents and synergists.

2. The Prior Art

It is well known in the art to use halogenated hydrocarbons to impart flame-retardant (FR) properties to flammable plastics. Examples of commercially available FR agents are Decabromodiphenyl oxide, Penta- and Octabromodiphenyl oxide, Hexabromocyclododecane and Tetrabromobisphenol A. It is also known that it is possible to employ mixtures of two or more of such halogenated hydrocarbons, which may be both in solid form or not, and/or mixtures which comprise inorganic or synergistic FR agents, such as antimony oxide or melamine isocyanurate. Non-solid FR compounds comprise, for instance, pentabromodiphenyl oxide. Other various additives are also often employed in admixture with the FR composition, such as binders or carriers, lubricants, smoke suppressors, anti-dripping agents, such as DPFA, and thermal stabilizers.

The halogenated FR compositions, however, are usually in fine powder form which presents several problems. Dispersion of the FR compound within the processed plastic is often nonhomogeneous, pollution problems due to dust formation are severe and certain additives, e.g., antimony oxide, are toxic. Therefore, several approaches have been tried in order to avoid direct use of FR compositions in powder form, for instance, by preparing master batches of the plastic containing high concentrations of FR composition; or colloidal suspensions of the FR compounds are prepared, which are then mixed with the monomer, or binders are used in order to prepare agglomerates of FR compounds.

SUMMARY OF THE INVENTION

It has now been found, and this is an object of the present invention, that it is possible to employ relatively large granules sizes (2-4 mm), for granules obtained through compaction and grinding, and that the said granules can be obtained without the addition of any binding agent.

It is a further object of the invention to provide a method for imparting flame retardancy to polymers, which eliminates the problem of dusting and potential health hazards existing in the methods known in the art.

It has further been found, and this is another object of the invention, that FR plastic material obtained through the use of the granular FR compositions of the invention do not show any appreciable difference in their properties, as compared to the material obtained by using the same FR agent in powder form. Furthermore, no difference in processability of the two different FR formulations (those processed with compacted agents and those processed with powders) is observable, in the normal course of polymer processing.

The FR compositions and process of the invention obviate many disadvantages of known processes, and further present several other advantages, as will be apparent hereinafter.

The flame-retardant granular compositions according to the invention are characterized in that they contain, in compacted granulated form, one or more halogenated hydrocarbon flame retardant compounds, alone or in admixture with organic or inorganic flame-retardant or flame-retardant synergistic compounds and/or additives. Preferably, the compacted form is a cold-compacted form.

By cold compaction it is meant that no external heat is added during the compaction operation for the purpose of aiding or promoting compaction and that compaction is substantially carried out by mechanical pressure. However, as it will be apparent to a person skilled in the art, it may be advantageous in some instances to maintain during processing, or during one or more stages thereof, a temperature higher than room temperature, e.g., for the purpose of promoting removal of volatile materials contained in the solid FR material or mixture. Thus, for example, DECA powder may contain some such volatile matters the removal of which can be assisted by causing the temperature to raise slightly, up to 40°-60° C. The heating of the FR material during processing, if effected for such purposes, does not substantially alter or affect the process of compaction as herein described, and any process employing such heating for purposes unrelated to the compaction process—and with temperatures which do not affect the mechanical properties of the material to be granulated—does not exceed the scope of the present invention.

The size-distribution of the said granules is preferably comprised between about 2 and about 4 mm. The additives which can be admixed with the FR compound(s) comprise, e.g., lubricants, thermal stabilizers, non-polymeric binders, smoke suppressors and carriers. Suitable smoke suppressors employed in the art are, e.g., ammonium molybdate, zinc borate and bismuth salts.

According to a preferred embodiment of the invention the halogenated hydrocarbon is selected from among pentabromodiphenyl ether, octabromodiphenyl ether, decabromodiphenyl ether, tetrabromobisphenol A and its derivatives, tetrabromobisphenol A bis(allylether), dibromopentyglycol, tribromopentylalcohol, hexabromocyclododecane, tribromophenyl allylether, tetrabromodipentaerythritol, bis(tribromophenoxy)ethane, ethylene bis(dibromonorbornane)dicarboximide, tetrabromobisphenol S bis(2,3-dibromopropyl)ether, poly(pentabromobenzylacrilate), and Dodecachloropentacyclooctadeca-7,15-diene, and the inorganic flame-retardant/synergistic compound is selected from among antimony oxide, magnesium oxide, magnesium hydroxide, ferric oxide, ammonium salts and cyanurate derivatives. The compacted material prepared according to the invention has a diametral crushing strength of at least 0.3 kg/sq.cm.. As it will be apparent to a person skilled in the art, the diametral crushing strength is an important parameter in order that a granular material be strong enough so that the granules do not disintegrate during normal handling. As the person skilled in the art will readily appreciate, too high values of the crushing strength may cause difficulties in processing, e.g., due to difficult disintegration of the granules. In such case, it will be required to adjust this value to the operating parameters employed in the process, as it will be apparent to the man of the art. The granules so obtained comprise bromo- or chloro-containing hydrocarbons or mixtures thereof, alone or in admixture with FR synergistic compounds such as metal oxides and sulfides, and organic salts of antimony, boron, arsenic and zinc borate.

The process for preparing a composition according to the invention is characterized by the steps of:

(a) feeding the flame-retardant material or mixture to a compacting apparatus;

(b) carrying out the compaction of the flame-retardant material or mixture in the compacting apparatus;

(c) feeding the resulting compacted material to a granulator;

(d) granulating the compacted material in the granulator;

(e) withdrawing the fraction of the throughput from the granulator, which has the desired size-distribution; and (f) optionally recycling the fraction of the granulated material having undesired sizes to the compacting apparatus;

According to a preferred embodiment of the invention, the compacting apparatus is a roll compactor. According to another preferred embodiment of the invention the granulator is a screen granulator.

Granulated flame retardant compositions, whenever prepared by the process of the invention, also form part of the present invention.

The process for producing flame-retarded articles according to the invention is characterized in that the material to which it is desired to impart flame-retardant properties is mixed during processing thereof with a granular composition according to the invention. Flame-retarded articles, whenever produced by the said process, also form part of the present invention.

A good distribution of a powder in the polymer is very difficult to obtain. Thus, the advantage of using granular material which, apart from the aforesaid advantages, is also more easily dispersed in the polymer, is an important feature of the invention. Since plastic processing apparatuses usually comprises nozzles, the problem of clogging thereof must be overcome. For this purpose, the art has employed very small powder sizes, or colloidal suspensions of FR material, in order to avoid such clogging and size problems. The granules of the invention, however, can be employed with large sizes such as 2–4 mm, since the FR material dispersed in the polymer melts together with the polymer itself or disintegrates therein, and is therefore finely distributed therein. When granules contain material which does not melt at the polymer processing temperature, such as antimony oxide or DECA, care must be taken to obtain a fine distribution of such materials within the FR granules, so that when the granules melt or disintegrate they will be liberated in fine powder form and homogeneously dispersed in the polymer. It should be noted that when pulverized material is employed homogeneous dispersion thereof in the polymer is hindered also by the formation of agglomerates of the FR material, which is avoided when operating according to the invention.

Another advantage of the invention is that it is possible to obtain FR agents having a bulk density much higher than that of the corresponding powdered composition. As it will be apparent to a person skilled in the art, this fact is advantageous both for shipping and storage purposes, and because it requires that smaller volumes of FR agent be processed, as compared to powdered agents. Table I below shows values for three different composition: decabromodiphenyl ether (DECA) alone, DECA in admixture with antimony oxide with a DECA/AO ratio of 3:1, and poly(pentabromobenzylacrilate) (PBB-PA). It can be seen that the bulk density of DECA and DECA/AO mixtures is considerably increased by compaction, while it remains unchanged for PBB-PA.

TABLE I

| MATERIAL | Bulk Density (g/cm$^3$) | |
|---|---|---|
| | Powder | Compacted |
| DECA | 1.043 | 1.583 |
| DECA/AO (3:1) | 1.107 | 1.694 |
| PBB-PA | 1.249 | 1.249 |

While the bulk density is not a parameter having an absolute value inasmuch as it is somewhat dependent on the method by which the sample has been prepared, such variations are not too great and the above data are indicative of the change in bulk density due to compaction granulation.

The ratio between the halo-containing compound and the synergistic compound will depend on the stability of the halo compound and the reactivity of the particular synergist employed as well as the plastic material employed. Generally this ratio can vary in a broad range such as between 95 parts synergistic compound to 5 parts halo-compound and 5 parts synergistic compound to 90 parts halo compound.

In addition to the main advantage that the compositions and method of the present invention are free from dusting, the effective content of flame retardant compositions is very high, since the granules of the invention are substantially free from carriers and binding materials.

The above and other characteristics and advantages of the invention will be better understood through the following illustrative and non-limitative examples.

DETAILED DESCRIPTION OF PREFERRED EMBODIMENTS

EXAMPLE 1

Compaction and Diametral Crushing Strength

Experiments were carried out at ambient temperature for testing the characteristics of the compaction of different FR/synergist formulations, utilizing the diametral compression test (as described in Materials Research & Standards, April 1963, pp. 283–284) for the measurement of tensile strength. The apparatus consisted of a circular cylindrical specimen, which is compressed diametrically between two flat plates. The maximal tensile stresses develop normally to the loading direction across the loaded diameter, and are proportional to the applied load. Loading produces a biaxial stress distribution within the specimen. The maximal tensile stress that acts across the loaded diameter is represented by the following formula:

$$TS = \frac{2P}{\pi Dt}$$

wherein: TS is the maximal tensile strength; P is the applied load; D is the specimen diameter and t is the thickness of the specimen.

This method of testing enables to determine substantially only the tensile strength, rather than shear or compressive failures. In the diametral-compression specimen, the amount of material subjected to stress is proportional to both the length and diameter. It has been found that antimony oxide alone cannot be compressed to a compacted form, without the aid of additives, by using pressures as high as 500-2000 Kg/sq. cm. By incorporating an organic flame retardant material, in amounts ranging from 10% to 90%, it was surprisingly found that strong granules containing antimony oxide can be obtained, whose diametral crushing strength is higher than 0.3 kg/sq. cm. Table II below summarizes the results for the diametral crushing strength (DCS) of granules obtained from mixtures of antimony oxide (AO) with two fire-retardant compounds, viz., DECA and tetrabromobisphenol A (TBBA).

TABLE II

| Run No. | Specimen Composition | | | Pressure applied (k/g) | DCS kg/cm$^2$ |
|---|---|---|---|---|---|
| | wt % AO[1] | wt % DECA[2] | wt % TBBA[3] | | |
| 1 | 90 | — | 10 | 2000 | 3.8 |
| 2 | 75 | — | 25 | 2000 | 2.8 |
| 3 | 75 | 25 | — | 2000 | 0.6 |
| 4 | 50 | 50 | — | 2000 | 1.2 |
| 5 | 50 | — | 50 | 2000 | 8.6 |
| 6 | 25 | 37.5 | 37.5 | 2000 | 4.4 |
| 7 | 25 | 75 | — | 1000 | 0.9 |

[1] antimony oxide produced By Anzon (Timonox White Star ™)
[2] DECA Produced by Bromine Compounds Limited
[3] TBBA Produced by Bromine Compounds Limited From the above table it can be seen that it is possible to obtain high diametral crushing strengths, and further that the value of the CDS can be tailored to the desired requirements by controlling the composition of the FR agent produced and the pressure employed.

The following examples illustrate the preparation of granular FR compositions. In all compaction experiments, a CS-25 compactor model (Bepex, Germany) was employed, unless otherwise indicated. In all experiments the hydraulic pressure was 40 bar, the pressure of the accumulator was also 40 bar and the pressure force was 70 kN. In all examples compaction is obtained in the absence of a binding agent.

EXAMPLE 2

800 g of octabromodiphenyl ether (OCTA) were fed through a screw feeder to the CS-25 compactor, using a roll speed of 7 rpm. The compacted material leaving the compactor, in the form of briquettes, was fed to a screen granulator which broke the briquettes produced by the compactor. The screen placed at the bottom of the granulator permitted to obtain the separation of the granules having the desired size-distribution, while granules having smaller size-distributions were recycled to the compactor. 57% of the throughput of the granulator was found to have the desired size-distribution (2-4 mm), and 43% thereof was recycled to the compactor.

EXAMPLE 3

Operating as in Example 2, but using a mixture of 75% OCTA and 25% Antimony Oxide, it was chosen to produce granules having a size-distribution of 2-3 mm. 30% of the material leaving the granulator was found to have the desired size-distribution, and the rest was recycled to the compactor. As it will be apparent to the man of the art, restriction of the range of sizes of the product results in a much higher recycle ratio, as expected.

EXAMPLE 4

Example 3 was repeated, but using pure DECA as the material to be granulated, and with a roll speed of 5 rpm. The results obtained were as in Example 3.

EXAMPLE 5

Example 2 was repeated, but using a mixture of 75% DECA and 25% AO. About 50% of a product, having a required size-distribution of 2-4 mm, was recovered from the granulator.

EXAMPLE 6

Example 3 was repeated, using PBB-PA as the material to be granulated, and with a roller speed of 12.5 rpm. About 30% of the throughput was recovered as granulated material having the desired size-distribution of 2-3 mm, and the rest was recycled to the compactor.

EXAMPLE 7

Example 6 was repeated, using a mixture of 73.1% PBB-PA, 24.4% $Sb_2O_3$ and 2.5% of calcium stearate. The results obtained were comparable to those of Example 6.

EXAMPLE 8

Example 6 was repeated, but using hexabromocyclododecane (HBCD) as the material to be granulated. 25% of the material having the desired size-distribution of 2-3 mm was recovered from the granulator, and the remaining fractions were recycled to the compactor.

EXAMPLE 9

Example 2 was repeated, but using a L 200/50 P compactor (Bepex), with a pressure force of 40 kN, and a mixture of 77% HBCD, 19.3% tribromophenyl allyl ether and 3.7% lubricants and heat stabilizers. 54% of the throughput of the granulator was found to have the desired size-distribution (2-4 mm).

The following examples illustrate the preparation of flame retarded polymeric materials, using the compositions according to the invention and compositions known in the art.

EXAMPLE 10

Three different runs were carried out, to prepare flame retarded high impact polystyrene (HIPS), using as the FR agent three different compositions: DECA in powder form, DECA is granulated (compacted) form, obtained in Example 4, and a mixture of 75% DECA and 25% AO, in compacted form (granules), obtained in Example 5. In all cases, care was taken to obtain a product having an identical total Br content of 10%.

The granules (and the DECA powder) were in each case thoroughly mixed with the HIPS (Galiren Q 88-5, produced by Israel Petrochemical Enterprises) by dry mixing, and then fed into a Buss Kneader RR 46 type extruder (Buss Ltd., Switzerland) at a processing temperature of 160°-190° C. Specimens were prepared by injection moulding at 210°-230° C., with an injection moulder machine of the type Allrounder-221-75-350 (Arburg). The FR HIPS so obtained was tested in each case for its FR and general properties, and the results of these tests are summarized in Table III.

TABLE III

| FORMULATIONS | Test No. 1 | Test No. 2 | Test No. 3 |
|---|---|---|---|
| Components % | | | |
| HIPS | 83 | 83 | 83 |
| Tinuvin P* | 0.5 | 0.5 | 0.5 |
| Tinuvin 770* | 0.5 | 0.5 | 0.5 |
| AO | 4.0 | 4.0 | — |
| DECA (powder) | 12.0 | — | — |
| DECA (compacted) | — | 12.0 | — |
| DECA (75%) + AO (25%) (compacted) | — | 13 | 16.0 |
| Br content | 10.0 | 10.0 | 10.0 |
| Properties | | | |
| UL-94 rating | V-O | V-O | V-O |
| Flaming time, sec | 0 | 8 | 4 |
| LOI % | 23.7 | 22.3 | 23.6 |
| HDT °C. (264 psi) | 63.8 | 65.4 | 63.4 |
| Izod notched impact, J/m | 49 | 63 | 64 |
| Elongation at break, % | 25.5 | — | 19 |
| U.V. stability (DE, 24h) | 36.5 | — | 37.5 |

*U.V. stabilizers (Ciba-Geigy AG)

EXAMPLE 11

Three different runs were carried out, to prepare flame retarded poly(butyleneterephtalate) (PBT), using as the FR agent three different compositions: PBB-PA in powder form, PBB-PA in granulated (compacted) form, obtained in Example 6 (composition I), and a mixture of 73.1% PBB-PA, 24.4% AO and 2.5 calcium stearate, in compacted form (granules), obtained in Example 7 (composition II).

The FR agent was in each case thoroughly mixed with the PBT, and processed as in Example 10. The processing temperature was 260°–275° C. and the temperature of injection was 240°–250° C. The results of these tests are summarized in Table IV below.

TABLE IV

| FORMULATIONS | non compacted | compacted (comp. I) | compacted (comp. II) |
|---|---|---|---|
| Components % | | | |
| PBT GFR Arnite TV4-261* | 87 | 87 | 87 |
| PBB-PA | 8 | — | — |
| Calcium Stearate (CS) | 1 | 1 | — |
| A.O. white star** | 4 | 4 | — |
| PBB-PA (compacted) | — | 8 | — |
| PPB-PA + AO + CS | — | — | 13 |
| Flammability | | | |
| LOI | 29.2 | 29.5 | 29.4 |
| UL-94, 1.6 mm | VO | VO | VO |
| HDT °C. | 191.7 | 198.2 | 198 |
| Impact Izod, Notched (J/m) | 82.7 | 69.4 | 75.0 |
| Tensile Properties | | | |
| Maximal Strength, MPa | 102.3 | 99.8 | 101.0 |
| Yield strength, MPa | 92.6 | 82.3 | 90.0 |
| Elongation at break, % | 2.6 | 2.7 | 2.5 |
| MODULUS, Mpa | 6900 | 6670 | 6800 |
| Shore Hardness | 75.5 | 75.5 | 75.2 |

*Glass-fiber reinforced containing 30% glass fibers (Akzo)
**Timonox White Star (Anzon)

The data reported in the above tables have been obtained according to the following standard tests.

Melt flow index: flow rates by extrusion plastometer (ASTM D 1238-79), on an extrusion plastometer Tinius Olsen Model Ve 4-78.

Flammability: UL-94 vertical burning test in a flammability hood (according to UL); and Limiting oxygen index (LOI) (ASTM D 2863-77) on a FTA Flammability Unit Stanton Redcroft.

Tensile yield strength; Elongation at break at yield and Modulus: (ASTM D 638-82) on a Zwick 1435 material testing machine.

Izod notched impact energy: (ASTM D 256-81) on a Pendulum impact tester type 5102 Zwick.

Tensile impact energy: (ASTM D 1822-79) on a Pendulum impact tester type 5102 Zwick.

HDT: Deflection temperature under flexural load (18.5 kg/cm$^2$) (ASTM D 648-72) on a CEAST 6055.

U.V. Stability: Accelerated weathering test—irradiation for 250 hrs and measuring of the color change by color deviation, on an Accelerated Weathering Tester Q-U-V (B-lamps), (The Q-Panel Co.).

Color deviation: Color measurement and comparison with reference specimen, on a Spectro Color Meter SCM-90, (Techno-Instruments Ltd.).

The above examples and description have been given for the purpose of illustration, and are not intended to be limitative. Many variations can be effected in the various compositions, methods and processes, without exceeding the scope of the invention.

We claim:

1. A cold-compacted flame-retardant granular composition comprising one or more halogenated hydrocarbon flame retardant compounds, said granular composition having a particle size between about 2 and about 4 mm, and comprising compacted powder particles substantially free of a binder, whereby a granular composition is provided which is substantially free of material which does not possess flame-retardant properties.

2. The composition according to claim 1 further including an added component comprising organic or inorganic flame-retardant or flame-retardant synergistic compounds or additives.

3. The composition according to claim 2, wherein said added component comprises up to about 90% of antimony oxide.

4. The composition according to claim 1 having a diametral crashing strength of at least 0.3 Kg/sq. cm.

5. The composition according to claim 2, wherein said added component comprises an additive selected from the group consisting of lubricants, thermal stabilizers, smoke-suppressors, anti-dripping agents and carriers.

6. The composition according to claim 5, wherein the halogenated hydrocarbon is selected from the group consisting of pentabromodiphenyl ether, octabromodiphenyl ether, decabromodiphenyl ether, tetrabromobisphenol A and its derivatives, tetrabromobisphenol A bis(allylether), dibromopentylglycol, tribromopentylalcohol, hexabromocyclododecane, tribromophenyl allylether, tetrabromodipentaerythritol, bis(tribromophenoxy)ethane, ethylene bis(dibromonorborane)dicarboximide, tetrabromobisphenol S bis(2,3-dibromopropyl)ether, and dodecachloropentacyclooctadeca-7,15-diene.

7. The composition according to claim 6, wherein said added component comprises a compound selected from the group consisting of antimony oxide, magnesium oxide, magnesium hydroxide, ferric oxide, ammonium salts and cyanurate derivatives.

8. A cold-compacted flame-retardant granular composition having a diametral crushing strength greater than about 0.3 kg./sq.cm, comprising a compacted powder substantially free of a binder, which powder comprises one or more halogenated hydrocarbon flame-retardant compounds, whereby a granular composition is provided which is substantially free of material which does not possess flame-retardant properties.

9. The composition according to claim 8, having a particle size up to about 4 mm.

10. The composition according to claim 9, having a particle size of between about 2 and 4 mm.

11. The composition according to claim 8 further including an added component comprising organic or inorganic flame-retardant or flame-retardant synergistic compounds or additives.

* * * * *

UNITED STATES PATENT AND TRADEMARK OFFICE
CERTIFICATE OF CORRECTION

PATENT NO. : 4,849,134
DATED : July 18, 1989
INVENTOR(S) : Pierre Georlette, et al.

It is certified that error appears in the above-identified patent and that said Letters Patent is hereby corrected as shown below:

Column 5, line 36, "CDS" should read -- DCS --.

Column 6, line 55, "is" should read -- in --.

Column 7, Table III, in the formulation DECA (75%) + AO (25%) the column headed "Test No. 2" should read -- - --.

Column 7, Table III, in the formulation Izod notched impact, J/m the column headed "Test No. 3" should read -- 57 --.

Column 7, Table III, after the formulation Izon notched impact, J/m, insert -- Tensile Impact, $kJ/m^2$  62 69 64 --.

Column 8, line 41, "crashing" should read -- crushing --.

Signed and Sealed this

Thirty-first Day of July, 1990

Attest:

HARRY F. MANBECK, JR.

*Attesting Officer*  *Commissioner of Patents and Trademarks*